(12) United States Patent
Flynn

(10) Patent No.: US 7,513,385 B2
(45) Date of Patent: Apr. 7, 2009

(54) AIR LOCK COVER VENT FOR TELECOMMUNICATIONS EQUIPMENT

(75) Inventor: Michael Patrick Flynn, Coto De Caza, CA (US)

(73) Assignee: Powerwave Technologies, Inc., Santa Ana, CA (US)

( * ) Notice: Subject to any disclaimer, the term of this patent is extended or adjusted under 35 U.S.C. 154(b) by 301 days.

(21) Appl. No.: 10/880,417

(22) Filed: Jun. 28, 2004

(65) Prior Publication Data

US 2005/0145631 A1    Jul. 7, 2005

Related U.S. Application Data

(60) Provisional application No. 60/483,488, filed on Jun. 27, 2003.

(51) Int. Cl.
    B65D 88/76    (2006.01)
(52) U.S. Cl. .................................................. 220/484
(58) Field of Classification Search .............. 454/6, 454/325, 323, 72, 123, 126, 142, 160, 9, 454/11, 14, 902, 184, 367
    See application file for complete search history.

(56) References Cited

U.S. PATENT DOCUMENTS

| | | | |
|---|---|---|---|
| 2,885,600 A | 5/1959 | Wiseman | |
| 2,932,953 A | 4/1960 | Becket et al. | |
| 3,345,449 A | 10/1967 | Hiller | |
| 3,581,918 A | 6/1971 | Fujioka | |
| 3,944,309 A | 3/1976 | Taniwaki | |
| 4,119,376 A | 10/1978 | Moyer | |
| 4,257,670 A * | 3/1981 | Legrand | 359/423 |
| 4,422,829 A * | 12/1983 | Buchanan | 417/40 |
| 4,449,579 A | 5/1984 | Miyazaki et al. | |
| 4,497,240 A * | 2/1985 | Nagatomo et al. | 454/75 |
| 4,693,418 A | 9/1987 | Peterman | |
| 4,694,484 A | 9/1987 | Atkinson et al. | |
| 5,004,304 A | 4/1991 | Segerpalm et al. | |
| 5,069,592 A | 12/1991 | Galperin | |
| 5,190,452 A | 3/1993 | Katchka et al. | |
| 5,417,486 A | 5/1995 | Manlove | |
| 5,564,280 A | 10/1996 | Schilling et al. | |
| 5,653,070 A | 8/1997 | Seguin | |
| 5,801,632 A | 9/1998 | Opal | |
| 5,925,848 A | 7/1999 | Elliot | |
| 5,999,403 A | 12/1999 | Neustadt | |
| 6,082,845 A | 7/2000 | Eizadkhah et al. | |
| 6,158,601 A | 12/2000 | Baker et al. | |
| 6,164,369 A | 12/2000 | Stoller | |
| 6,182,677 B1 | 2/2001 | Pignataro | |
| 6,227,397 B1 | 5/2001 | Kim | |
| 6,238,029 B1 | 5/2001 | Marzec et al. | |
| 6,256,505 B1 | 7/2001 | Kingdon et al. | |
| 6,262,894 B1 | 7/2001 | Nelson et al. | |
| 6,304,441 B1 | 10/2001 | Han | |
| 6,338,596 B1 * | 1/2002 | Galeazzi et al. | 405/129.5 |
| 6,339,372 B1 | 1/2002 | Warnock et al. | |
| 6,411,825 B1 | 6/2002 | Csapo et al. | |

(Continued)

*Primary Examiner*—Steve McAllsiter
*Assistant Examiner*—Helena Kosanovic
(74) *Attorney, Agent, or Firm*—Myers Andras Sherman LLP

(57) ABSTRACT

An improved vault that facilitates the underground storage of electronic equipment, such as instrumentation for wireless telecommunications antenna systems. The vault preferably includes an air lock cover that prevents the electronic equipment from being submerged under water when the vault floods.

20 Claims, 3 Drawing Sheets

U.S. PATENT DOCUMENTS

| | | |
|---|---|---|
| 6,416,143 B1 | 7/2002 | Janson |
| 6,462,949 B1 | 10/2002 | Parish et al. |
| 6,681,702 B1 | 1/2004 | Nicely |
| 6,807,057 B2 * | 10/2004 | Rubenstein et al. ......... 361/697 |
| 2003/0081381 A1 * | 5/2003 | Moizer ...................... 361/690 |

* cited by examiner

AIR LOCK COVER VENT FOR TELECOMMUNICATIONS EQUIPMENT

CROSS-REFERENCE TO RELATED APPLICATION

This application claims the benefit of U.S. Provisional Application No. 60/483,488, filed Jun. 27, 2003, which application is incorporated herein by reference.

FIELD OF THE INVENTION

The present invention relates generally to subterranean enclosures for electronic equipment and, more particularly, to a subterranean vault for underground storage of electronic equipment, such as instrumentation for wireless telecommunications transceiver systems, and an equipment cover that protects the equipment against flooding.

BACKGROUND OF THE INVENTION

Public demand for wireless communications has grown at a tremendous rate. An increasing number of people rely on their wireless phones and other devices for an increasing number of uses including voice, messaging, data, video, and internet access. This enormous public demand has in turn fueled the need for additional carrier antenna sites to provide expanded wireless coverage to communities.

As the need for additional antenna sites has grown, so too has the installation restrictions set by many municipalities. Wireless carriers are being required to place their transceiver equipment in an aesthetically pleasing manner. In many municipalities the planning departments are unwilling to grant permit applications for unsightly tower installations. There is also a growing tendency for many of these municipalities to require even the smallest of transceiver circuitry units to be placed underground, and for the antennas to be disguised or stealthed.

The units housing the transceiver or transmitting and receiving circuitry for wireless communications systems come in different sizes, and have different power and transceiver configurations. The standard or "macro-cell" unit is a compact base transceiver station ("BTS"), which stores six (6) to eight (8) transceivers or radios requiring 1800 to 2200 watts of power. The smallest unit currently used, primarily where a mono-pole transceiver system is inappropriate, is a "micro-cell", which typically houses one (1) to two (2) transceivers requiring 170 to 600 watts of power. To meet the restrictions imposed by the municipalities, these macro- and micro-cell units are placed in self contained, sealed subterranean vaults. These may be made of concrete or steel.

The problem with any self-contained, sealed underground vault is that the telecommunications equipment enclosed therein generates heat, which ultimately damages or destroys the equipment. Moisture, either from evaporation or flooding from rain, can also damage or destroy the equipment. These problems are typically solved by using an air conditioner and dehumidifier in conjunction with a water pump. However, in the case of flooding, if the pump is unable to keep up with incoming flow or water, the telecommunications equipment can become submerged in water and ultimately damaged or destroyed.

Thus, it would be desirable to provide the wireless communications industry with a vault to house telecommunications equipment underground that maintains proper climate control for equipment longevity and protects the equipment against flooding.

SUMMARY OF THE INVENTION

The present invention is directed to an improved vault or cabinet for subterranean storage of electronic equipment, such as wireless telecommunications equipment. In a particularly innovative aspect of the invention, the cabinet includes an air tight inner enclosure forming an air lock over and around the electronic equipment to prevent water from rising within the inner enclosure and submerging the electronic equipment as the cabinet floods. In a preferred embodiment, the cabinet further comprises an air guide interposed between the inner enclosure and the electronic equipment to aid in directing air flow up and over the electronic equipment. Preferably, the air guide includes a plurality of perforations or apertures that aid in heat transfer of the heat generated by the electronic equipment.

To draw air into the cabinet and between the inner enclosure and air guide, the cabinet includes an intake fan and an exhaust fan. The cabinet further includes a water evacuation system including a sump pump coupled to an exhaust check valve.

The fans and pump are preferably battery powered and the battery is preferably charged by a solar panel mounted in a lid of the cabinet under a clear panel.

Other aspects and features of the present invention will become apparent from consideration of the following description taken in conjunction with the accompanying drawings.

DETAILED DESCRIPTION OF PREFERRED EMBODIMENTS

Figure 1:
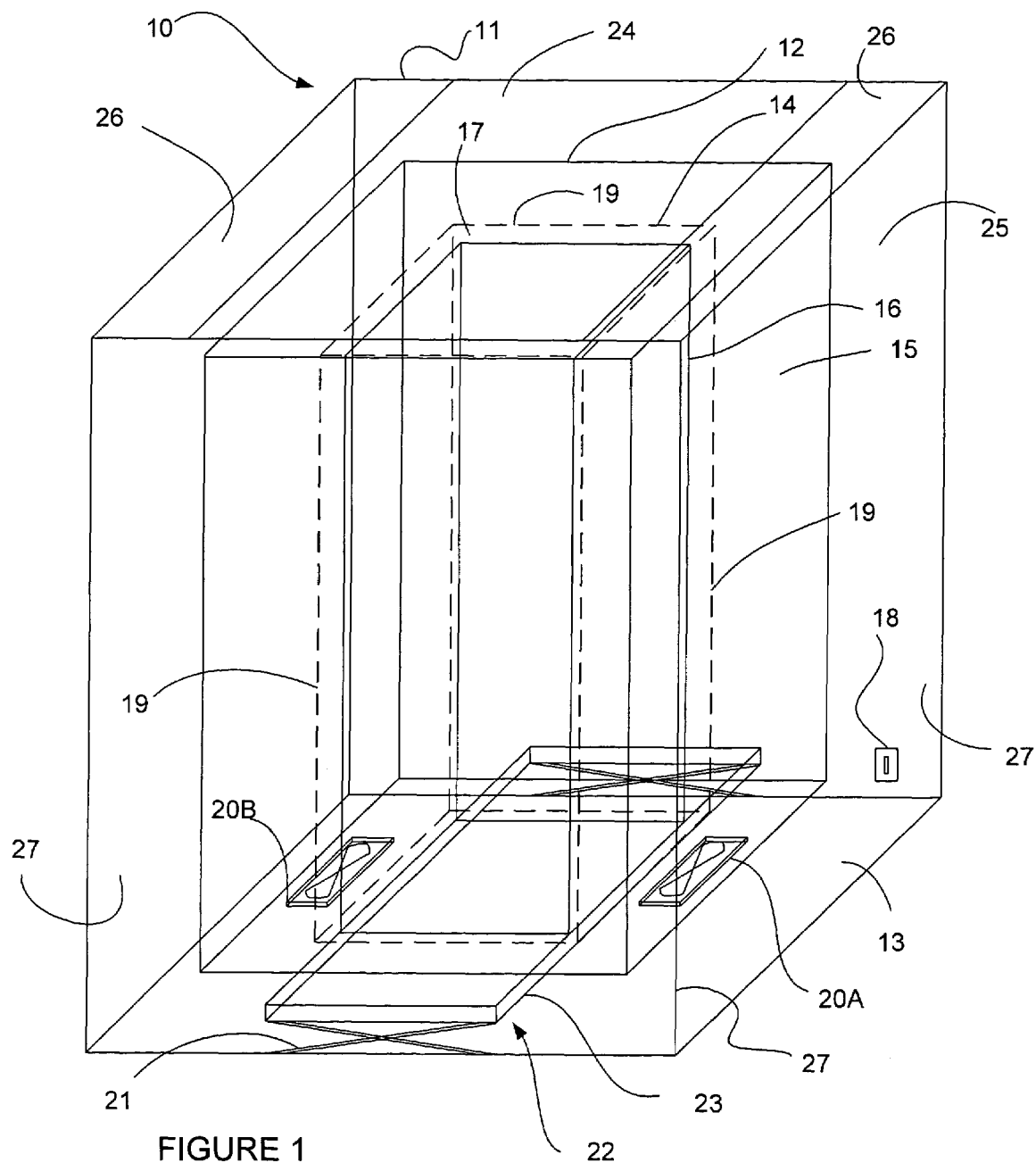
FIG. 1 is an isometric view of a subterranean electronic equipment vault of the present invention.
Figure 2:
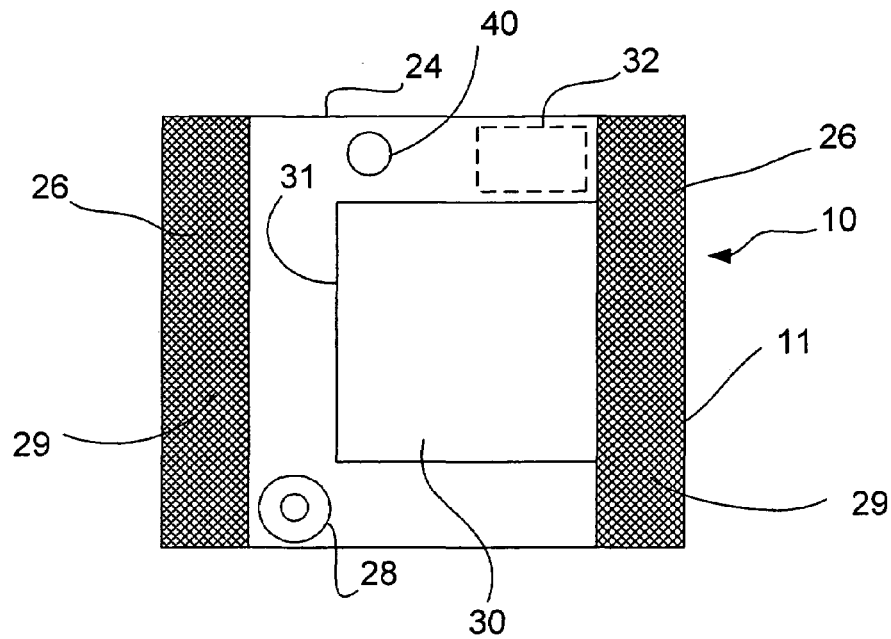
FIG. 2 is a top view of the vault shown in FIG. 1.

Referring to FIGS. 1-4, a cabinet or vault 10 for subterranean storage of electronic equipment is shown. The vault 10 includes an enclosure 11 that is preferably formed as a metal weldment. In a preferred embodiment, the enclosure 11 is a stainless steel weldment. Use of a metal, such as stainless steel, advantageously allows the surrounding earth to aid in the dissipation of heat from the vault 10 and, also, advantageously enables the vault 10 to be smaller, without sacrificing strength or equipment security. As a result, the vault 10 can advantageously be placed next to or under vertical structures, such as a light standard, in existing public rights of way.

Alternatively, the enclosure 11 may be formed of reinforced ultra violate inhibitent plastic injection molded material and may be made to any size necessary to accommodate the electronic equipment to be stored.

The enclosure 11 includes vertical walls 27 coupled to a bottom plate or base 13. A top plate or lid 24 is releasably coupled to the walls 27 at the top of the vault 10 to cover or close an equipment access opening through which equipment can be loaded into the vault 10 or accessed for repair and maintenance. The lid 24 includes air vents 26 formed in the lid 24 and covered with an air permeable mesh 29, preferably metal, to keep out debris. The lid 24 may include a handle (not shown), a releasably lockable hinge or shock absorber-type hinge (not shown) to maintain the lid 24 in a generally vertical position, a security locking system (not shown), and a magnetic seal similar to those used on refrigeration units (not shown). In addition, the lid 24 preferably includes a view port 40 with a magnifier lenses inserted for viewing a power meter and other instrumentation within the vault 10 while the lid 24 is in a closed position.

In a preferred embodiment, the lid 24 includes a solar panel 30 mounted below a clear cover 31 and a battery 32 coupled to the solar panel and mounted on the underside of the lid 24. The solar panel is used to charge the battery 32 which is used to power fans and a pump mounted within the enclosure 11 of the vault 10.

Figure 4:
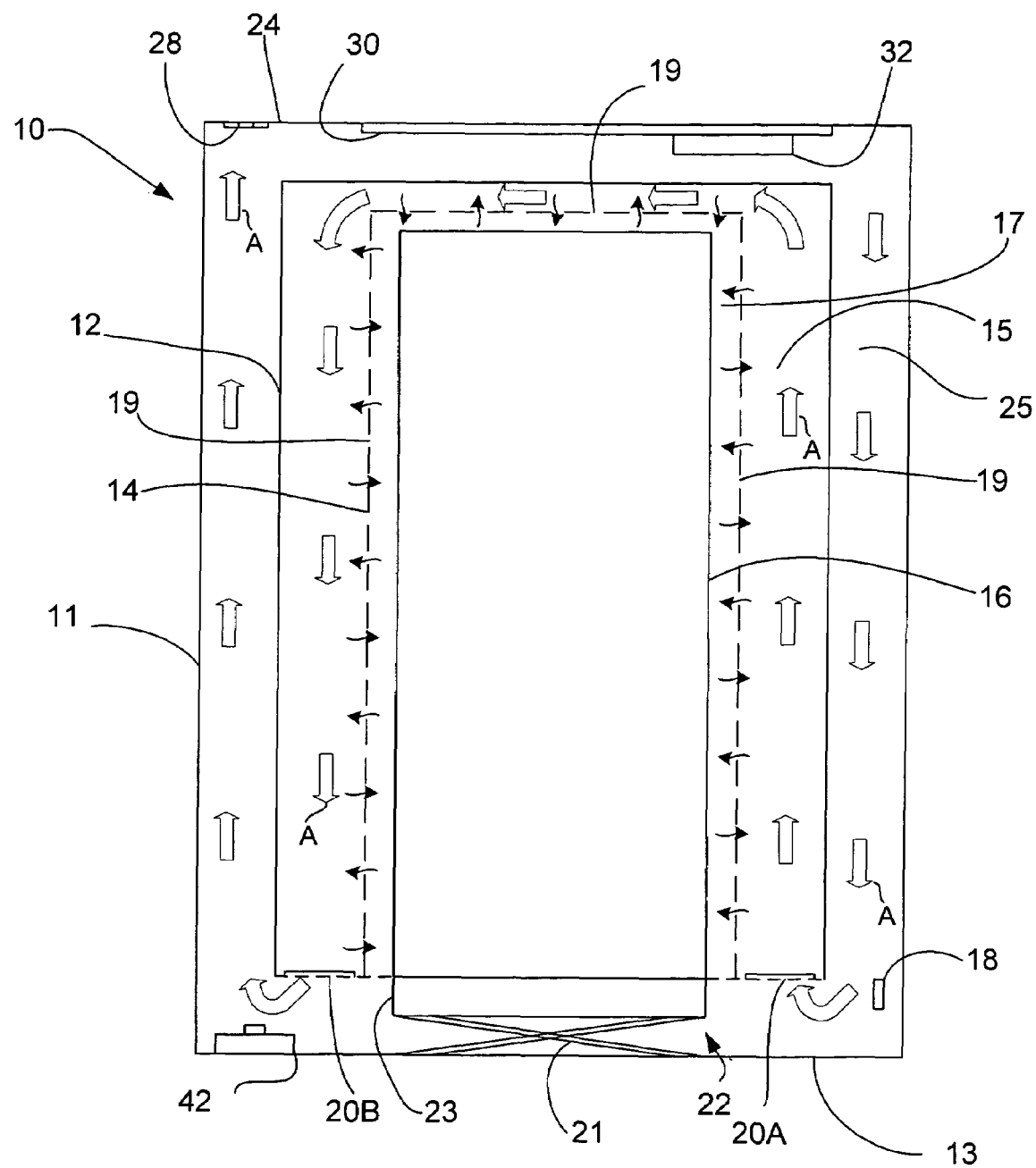
FIG. 4 is a side view of the vault.

The vault 10 preferably houses an electronic equipment cabinet 16 in which electronic equipment, such as instrumentation for wireless telecommunications transceiver systems, is stored. The cabinet 16 is preferably mounted above and in spaced relation with the base 13 of the vault on a pedestal 23 of a mechanical lift 22. A spring-loaded scissor-like lifting mechanism 21 is coupled to the pedestal 23. The mechanical lift 22 is used to lower the equipment cabinet 16 and other components into the vault 10 and, when needed, lift the cabinet 16 and other components out of the vault 10 for maintenance and repairs. The spring-loaded scissor mechanism 21 is of sufficient strength to cause a fully loaded unrestrained cabinet 16 to rise out of the enclosure 11. An offset force of 25 to 50 pounds is necessary to reposition the cabinet 11 in the enclosure 11. Hooks or brackets (not shown) are preferably used to maintain the cabinet in a down position as shown in FIGS. 1 and 4.

The vault 10 preferably includes a novel cooling and flood prevention system which is capable of effectively cooling the operating electronic equipment and preventing the equipment from being submerged under water should the vault's water evacuation system fail to keep up with incoming water. The water evacuation system preferably includes a float-type sump pump 42 connected to the battery 32, and located adjacent the bottom of the vault 10. A pipe (not shown) extends from the pump 42 to an exhaust valve 28 mounted in the lid 24 of the vault 10. The exhaust valve 28 is a commonly known one-way, pressure-type check valve.

The cooling and flood prevention system preferably includes an air lock cover 12 that is positionable over the equipment cabinet 16 in spaced relation with the entirety of the cabinet 16. Like the cabinet 16, the air lock cover 12 is preferably mounted above and in spaced relation to the base 13 of the vault 10. The air lock cover 12 is an enclosure comprising vertically extending side walls, a top wall coupled to the side walls and an open bottom end formed by the side walls. The air lock cover 12 is preferably formed from reinforced ultra violate inhibitent plastic injection molded material.

In addition to the air lock cover 12, the cooling system preferably includes an air management guide 14 interposed between the air lock cover 12 and the equipment cabinet 16. The guide 14 is preferably in spaced relation with the entirety of the cabinet 16 forming an air gap 17 therebetween. The air management guide 14 is also an enclosure comprising vertically extending side walls, a top wall coupled to the side walls and an open bottom end formed by the side walls. The guide 14 is also preferably formed from reinforced ultra violate inhibitent plastic injection molded material.

Figure 3:
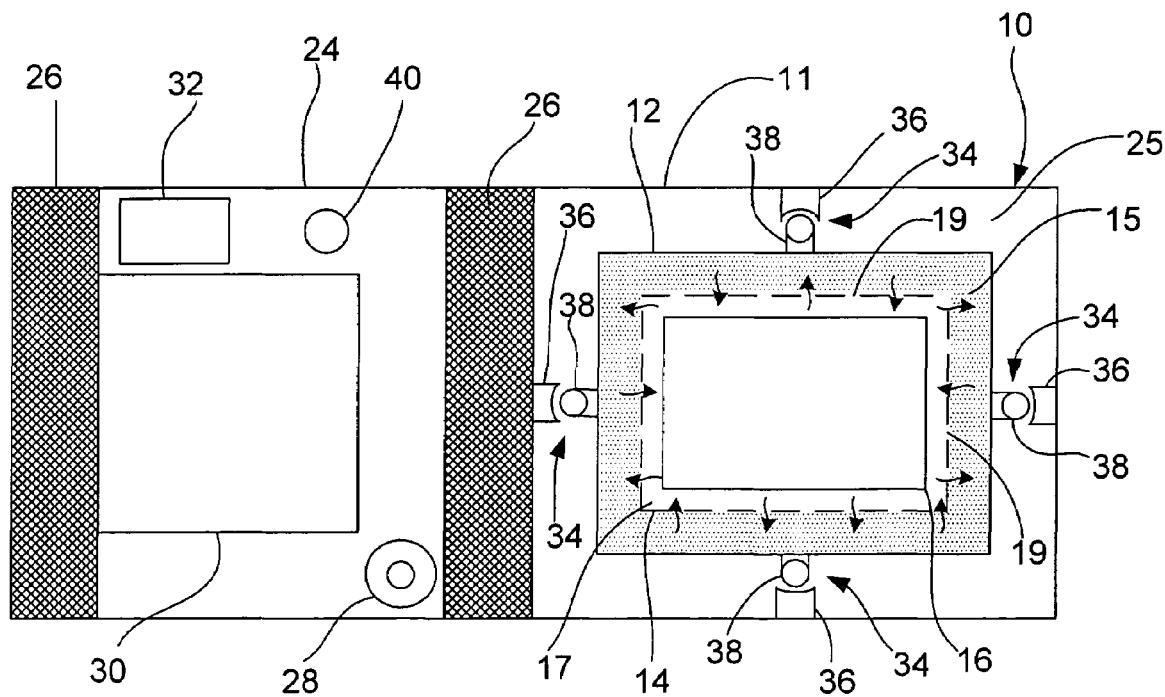
FIG. 3 is another top view of the vault with its lid opened.

As depicted in FIGS. 1, 3 and 4, the air lock cover 12 is in spaced relation with the entirety of the air management guide 14 forming an air gap or plenum 15 therebetween to direct air flow up and over the equipment cabinet 16. Additional air baffles (not shown) may be located between the air lock cover 12 and the air management guide 14 to further assist in directing air flow up and over the equipment cabinet 16. The air management guide 14 preferably includes a plurality of apertures or perforations 19 which, as shown in FIGS. 3 and 4, aid in heat exchange, i.e., heat from the equipment cabinet 16 is exhausted into the air plenum 15 as cool air from the air plenum 15 enters the interior of the air management guide 14.

An intake fan 20A and an exhaust fan 20B are mounted adjacent openings to the air lock cover 12 located beyond the outer boundaries of the pedestal 23. The fans 20A and 20B, which are connected to the battery 32, are preferably coupled to a float switch 18 mounted in the vault 10 adjacent the base 13 of the vault 10. The float switch 18 is configured to shut off the fans 20A and 20B when water rises to a predetermined level in the vault 10 to prevent the fans from drawing water into the air lock cover 12 and over the equipment cabinet 16.

In order to raise or remove the air lock cover 12, the vault 10 includes several lift guides 34 positioned about the air lock cover 12. The lift guides 34 each include a guide track 36 mounted vertically along the interior wall of the vault enclosure 11 and a follower 38 comprising a ball, roller, wheel and the like operably coupled or received by the track 36. A handle (not shown) may be mounted on the top of the air lock cover 12 and used to raise and lower the cover 12.

The air lock cover 12, which is air tight, is used to maintain electronic equipment underground in a completely water tight environment. The air lock cover 12 preferably forms an air pocket or bubble around the equipment cabinet 16 which prevents water from rising within the air lock cover 12 and submerging the cabinet 16. As a result, the equipment will remain dry if the vault 10 floods—even if the vault 10 floods completely.

In operation, the vault 10 is placed in the ground such that the top of the enclosure 11 is level with the surface of the ground. Once powered on, the air intake fan 20A draws air, as depicted in FIG. 4 by the arrows A, into the vault through the air vent 26, down along the air lock cover 12 through an air plenum 25 formed between the side walls of the vault enclosure 11 and the air lock cover 12 and then up into the air plenum 15 between the air lock cover 12 and the air management guide 14. The exhaust fan 20B then draws the air through the air plenum 15 up and over the air management guide 14, and then out of the air plenum 15. The exhausted air tends to rise up through the air plenum 25 and exhausts out of the air vents 26 in the lid 24.

If, however, water begins to flood the vault 10 and the sump pump 42 is over come such that the water rises to a predetermined level within the vault 10, the float switch 18 is triggered and cuts off power to the fans 20A and 20B. When the water reaches the bottom of the air lock cover 12, an air pocket or bubble is formed or trapped between the walls of the air lock cover 12 and the water. The air pocket prevents the water from rising within the air lock cover 12 and submerging the equipment cabinet 16 and damaging the equipment stored therein. Once the water subsides to a predetermined level within the vault 10, the float switch 18 triggers power to the fans 20A and 20B.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A cabinet for underground storage of electronic equipment, comprising:
    an enclosure, and an air lock cover mounted within the enclosure in spaced relation with a floor of the enclosure and over electronic equipment disposed with the enclosure, said air lock cover configured so as to prevent air from entering and leaving said air lock cover when water rises above a bottom of the air lock cover.

2. The cabinet of claim 1 further comprising a air guide mounted within the airlock cover in spaced relation with the air lock cover and the base of the enclosure.

3. The cabinet of claim 2 further comprising a plurality of apertures formed in the air guide.

4. The cabinet of claim 3 further comprising an intake fan mounted within the enclosure in fluid communication with a space formed between the air guide and the air lock cover.

5. The cabinet of claim 4 further comprising an exhaust fan mounted within the enclosure in fluid communication with a space formed between the air guide and the air lock cover.

6. The cabinet of claim 5 further comprising a float switch coupled to the intake and exhaust fans.

7. The cabinet of claim 6 further comprising a battery coupled to the intake and exhaust fans.

8. The cabinet of claim 7 further comprising a solar panel coupled to the battery.

9. The cabinet of claim 8 further comprising a view-port formed in a lid of the enclosure.

10. The cabinet of claim 9 wherein the view-port includes a magnifying lenses.

11. The cabinet of claim 10 further comprising a sump pump mounted in the enclosure and coupled to an exhaust check valve.

12. A subterranean vault for storage of electronic equipment, comprising:

a outer enclosure, an inner enclosure mounted within the outer enclosure and in spaced relation to a base of the outer enclosure, the electronic equipment configured inside the inner enclosure, and an intermediate enclosure mounted within the outer enclosure interposed between and in spaced relation with the outer and inner enclosures forming an air flow plenum therebetween, said intermediate enclosure configured so as to prevent air from entering and leaving said intermediate enclosure when water rises above a bottom of the intermediate enclosure.

13. The vault of claim 12 wherein, the inner enclosure includes a pluralities of perforations.

14. The vault of claim 12 further comprising first and second fans in fluid communication with the air flow plenums.

15. The vault of claim 12 further comprising a solar panel mounted in the outer enclosure.

16. The vault of claim 12 further comprising a battery coupled to the solar panel and the first and second fans.

17. The vault of claim 12 further comprising a cover and an air vent in the cover.

18. The vault of claim 12 further comprising a view port formed in the cover.

19. The vault of claim 12 further comprising a magnifier mounted in the view port.

20. The vault of claim 12 further comprising a lift mechanism.

* * * * *